(12) United States Patent
Sytsma et al.

(10) Patent No.: US 7,017,914 B1
(45) Date of Patent: Mar. 28, 2006

(54) PISTON ASSEMBLY AND METHOD OF MANUFACTURE

(75) Inventors: Steven John Sytsma, Muskegon, MI (US); John C. Lahrman, Muskegon, MI (US); Vernon M. Daffron, Ellisville, MO (US)

(73) Assignee: Dana Corporation, Toledo, OH (US)

( * ) Notice: Subject to any disclaimer, the term of this patent is extended or adjusted under 35 U.S.C. 154(b) by 355 days.

(21) Appl. No.: 10/271,109

(22) Filed: Oct. 15, 2002

(51) Int. Cl.
*F16J 9/12* (2006.01)
(52) U.S. Cl. ........................ 277/452; 277/453
(58) Field of Classification Search ............... 277/434, 277/452, 453, 496–9
See application file for complete search history.

(56) References Cited

U.S. PATENT DOCUMENTS

| 1,381,993 | A | * | 6/1921 | Hill et al. | 277/447 |
|---|---|---|---|---|---|
| 3,104,594 | A | * | 9/1963 | Reiners | 92/227 |
| 3,831,952 | A | * | 8/1974 | Geffroy | 277/447 |
| 3,895,815 | A | * | 7/1975 | Panigati | 277/448 |
| 3,926,166 | A | | 12/1975 | Packard | |
| 4,123,072 | A | | 10/1978 | Sharpe | |
| 4,299,401 | A | | 11/1981 | McCormick | |
| 4,681,326 | A | | 7/1987 | Kubo | |
| 4,815,429 | A | | 3/1989 | Thornton | |
| 6,131,503 | A | | 10/2000 | Takashima | |

FOREIGN PATENT DOCUMENTS

| DE | 4117212 A1 | * | 12/1992 |
|---|---|---|---|
| JP | 3-223568 | * | 10/1991 |
| JP | 2001-182831 | * | 7/2001 |

OTHER PUBLICATIONS

Patent Abstracts of Japan (Publication No. 03223568) (1 page).
Patent Abstracts of Japan (Publication No. 2001182831) (1 page).
International Search Report (2 pages).

* cited by examiner

*Primary Examiner*—Alison K. Pickard
(74) *Attorney, Agent, or Firm*—Rader, Fishman & Grauer PLLC

(57) ABSTRACT

A piston assembly having a piston and a piston ring. The ring mates to the piston in a groove on the outer surface of the piston. The ring includes two side walls that connect between inner and outer peripheral walls. The side walls converge outwardly at different angles from the inner peripheral wall to the outer peripheral wall. The angles are different to produce a twist feature of the ring within the piston groove to generate a better seal by the ring. The groove of the piston is generally tapered and has top and bottom walls converging at angles approximately equal to the angles of the side walls of the ring. A method of manufacturing the piston assembly includes forming first and second side walls having first and second angles by outwardly converging from the inner peripheral wall to the outer peripheral wall.

3 Claims, 2 Drawing Sheets

PISTON ASSEMBLY AND METHOD OF MANUFACTURE

TECHNICAL FIELD

The present invention relates to a piston assembly for an internal combustion engine and in particular to a piston assembly and method of manufacture having a piston ring with two side walls converging at dissimilar angles.

BACKGROUND OF THE INVENTION

There are traditionally two different types of piston rings, oil control rings and compression rings. Typically, the piston assembly includes one or more compression rings to generate a seal between the outer surface of the piston and an inner surface of the liner of the combustion chamber. An inner end of the compression ring fits into a tapered groove on the outer surface of the piston while an outer wall of the ring makes contact with the inner surface of the liner. The outer wall of the compression ring generates the seal in the space between the piston and the liner to prevent high-pressure combustion gases and air from escaping.

Typical prior art piston assemblies are shown in FIGS. 1a and 1b. The assembly 10 includes a piston 12 and a piston ring 14. The seal formed by the piston ring 14 prevents combustion gases and air from escaping the combustion chamber with each stroke of the piston 12. The piston ring 14 includes an inner peripheral wall 20, an outer peripheral wall 22, a first side wall 24 and a second side wall 26. The first side wall 24 and the second side wall 26 extend from the inner peripheral wall 20 to the outer peripheral wall 22. As shown, the prior art piston rings 14 have angles, A, generated by the outward convergence of the side walls 24, 26. In the prior art, the angles, A, are equal, for example, each angle, A, would be approximately 7.5 degrees.

To improve the seal of the ring 14, manufacturers have found it desirable to twist the ring 14 within a tapered groove 30 of a piston 12. Twisting the ring 14 causes an edge 28 of the outer peripheral wall 22 of the ring 14 to bear against a liner (not shown) with an increased force as compared to the rest of the outer peripheral wall 22. This increased force on the edge 28 of the outer peripheral wall 22 generates a more effective seal and prevents leakage of gases, air and lubricating-oils between the liner and the outer peripheral wall 22. Furthermore, twisting the ring 14 within the groove 30 reduces the clearance between the ring 14 and the groove 30 to provide continuity of the seal. To twist the ring 14, traditionally the first side wall 24 is beveled to generate an intermediate wall, B. The intermediate wall, B permits the ring 14 to twist within the tapered piston groove 30 and provide a better seal when contacting the liner and the piston 12.

To manufacture the conventional piston ring 14 with the beveled intermediate wall, B, and the resultant twist feature, the piston ring 14 is first machined to generate the two side walls 24, 26 at equal angles, A. Typically to produce the beveled intermediate wall, B, an additional machining process is necessary to remove the material from the first side wall 24. This additional machining process is time consuming. Alternatively, other techniques for generating the beveled intermediate wall, such as making the ring 14 from near net shape wire to include the beveled intermediate wall, B, are commonly used in the industry.

SUMMARY OF THE INVENTION

The inventors of the present invention have recognized these and other problems associated with traditional piston assemblies described above. To this end, the inventors have developed a piston assembly including a piston and a piston ring having the twist feature without the need for the beveled intermediate wall.

Specifically, the invention comprises a piston assembly comprising a ring and a piston. The ring has inner and outer peripheral walls along with first and second side walls. The first side wall of the ring converges outwardly at a first angle from the inner peripheral wall to the outer peripheral wall. The second side wall of the ring also converges outwardly from the inner peripheral wall to the outer peripheral wall, but at a second angle that is different than the first angle.

The invention also describes a method of manufacture for a piston assembly. First, the first side wall is formed having a first angle outwardly converging from the inner peripheral wall to the outer peripheral wall of the piston ring. Next, the second side wall is formed having a second angle outwardly converging from the inner peripheral wall to the outer peripheral wall, wherein the first angle is different than the second angle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1A:
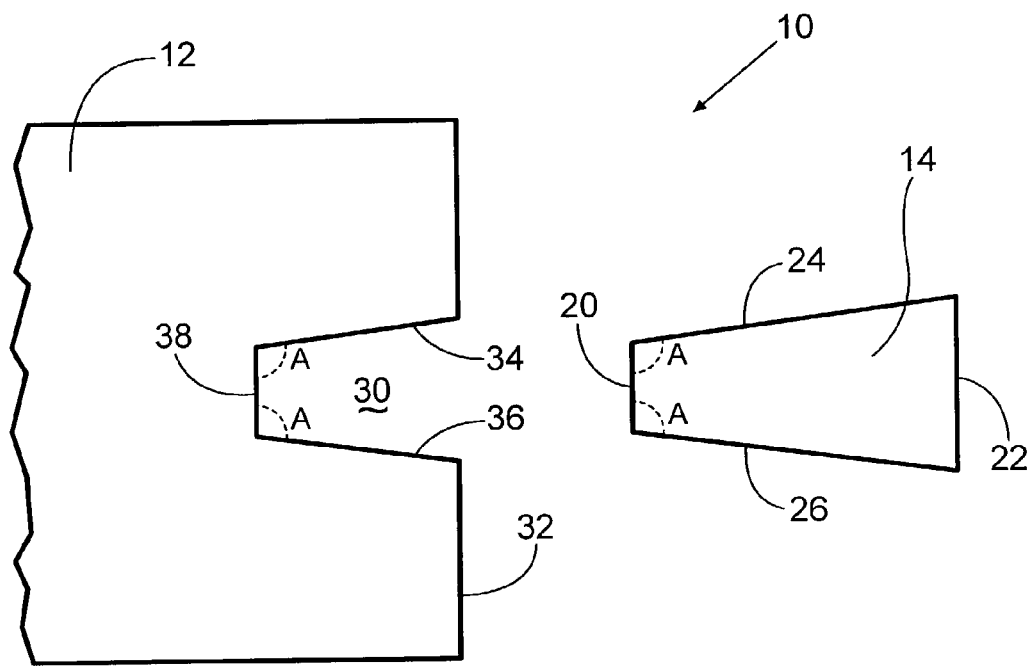
FIG. 1a is an exploded side view of a piston assembly well known in the prior art.
Figure 1B:
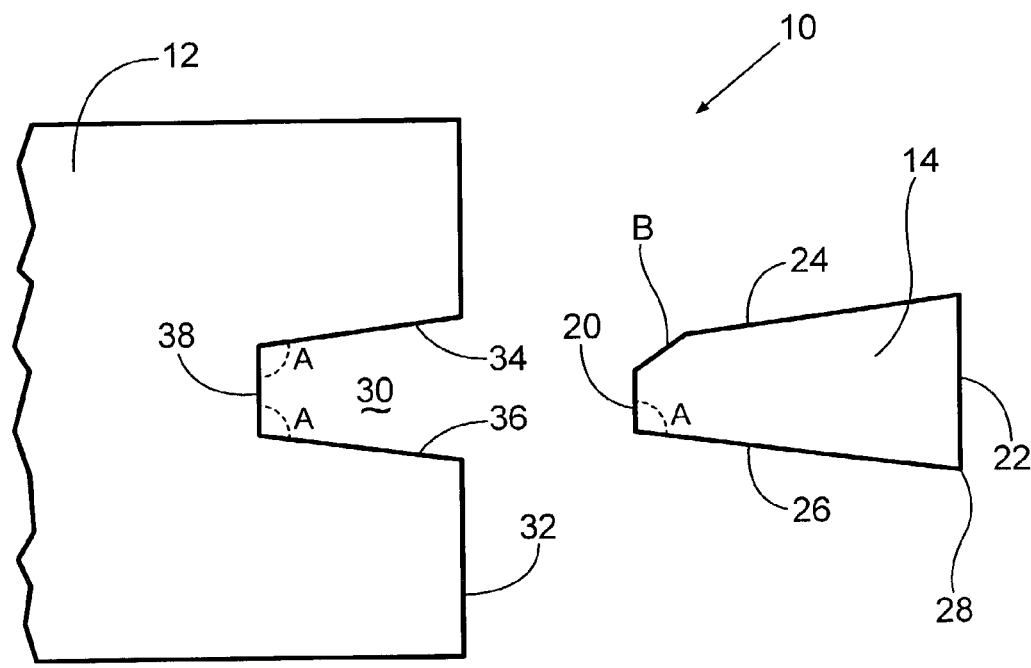
FIG. 1b is an exploded side view of a piston assembly having a beveled intermediate wall well known in the prior art.
Figure 2:
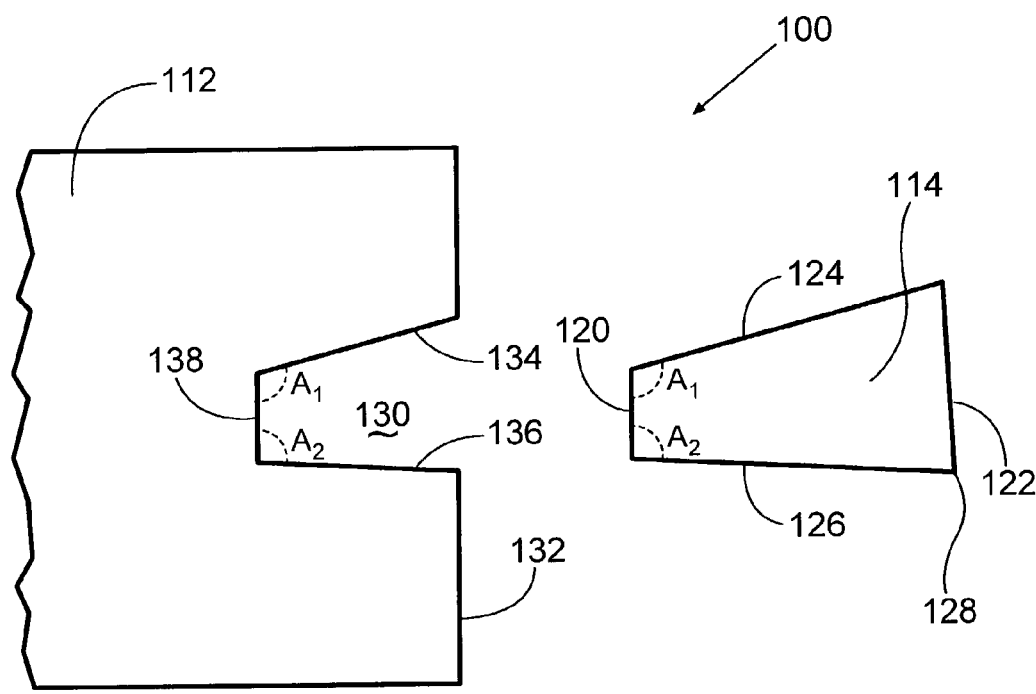
FIG. 2 is an exploded side view of a piston assembly of the present invention.
Figure 3:
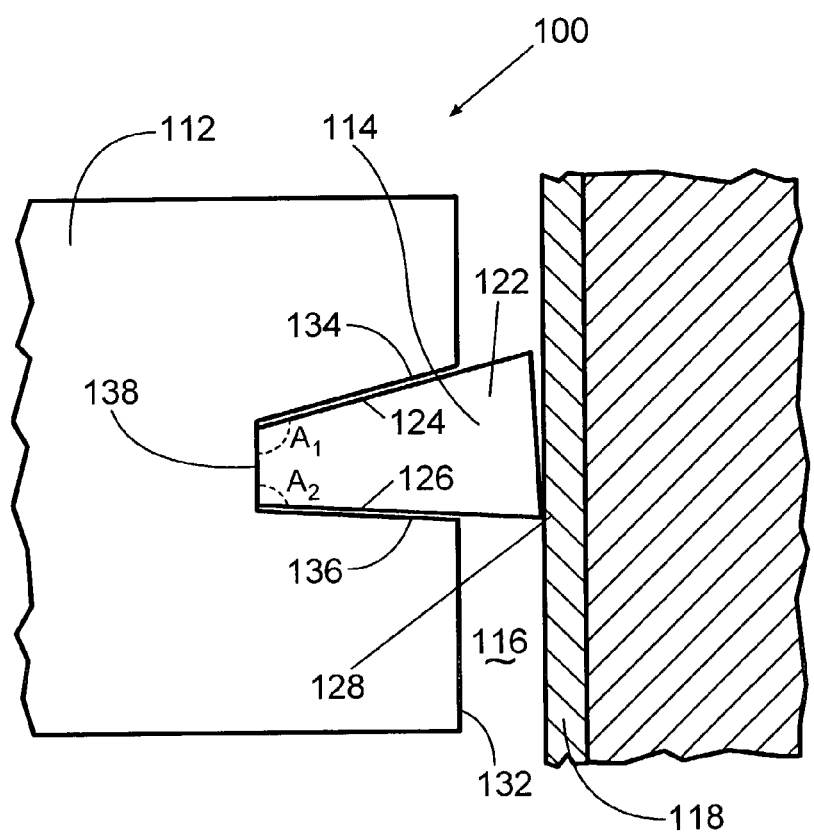
FIG. 3 is a side view of the piston assembly of the present invention within a combustion chamber of an internal combustion engine.

As seen in FIGS. 2 and 3, a piston assembly is generally shown at 100. Similar to the prior art, the assembly 100 includes a piston 112 and a piston ring 114. The piston assembly 100 is housed within a combustion chamber 116 of an internal combustion engine (not shown). Within the combustion chamber 116 is a cylinder liner 118. The ring 114 surrounds the piston 112 and contacts the cylinder liner 118 to form a seal. The piston ring 114 includes an inner peripheral wall 120, an outer peripheral wall 122, a first side wall 124 and a second side wall 126. In accordance with the invention, the first side wall 124 outwardly converges from the inner peripheral wall 120 to the outer peripheral wall 122. The intersection of the inner peripheral wall 120 and the first side wall 124 forms a first angle, A1. Similarly, the second side wall 126 also outwardly converges from the inner peripheral wall 120 to the outer peripheral wall 122 and the intersection of the inner peripheral wall 120 and the second side wall 126 forms a second angle, A2. Additionally, both the first side wall 124 and the second side wall 126 are linear and approximately equal in length.

In contrast to the prior art, the present invention has the first angle, A1, different from the second angle, A2. Preferably, the first angle, A1, is different than the second angle, A2, by at least one degree. It has been found that the greater the difference between the first angle, A1, and the second angle, A2, the greater the twisting feature that is produced. For example, the first angle, A1, would be approximately twelve degrees and the second angle, A2, would be approximately three degrees. The angles of approximately twelve degrees and approximately three degrees are a working example and the invention is in no way limited to these angle measurements. The difference between the first angle, A1, and the second angle, A2, produces a twisting feature of the piston ring 114 as best shown in FIG. 3. The twisting feature forces an edge 128 of the outer peripheral wall 122 to bear against the liner 118 and provides an effective seal to prevent gases and air from escaping. Unlike the prior art, the dissimilar first angle, A1, and second angle, A2, produce this twisting feature, therefore eliminating the need to create an intermediate wall, B, of the traditional prior art piston rings.

The piston 112 further includes a groove 130 that circumferentially surrounds an outer surface 132 of the piston 112. The groove 130 receives the piston ring 114 to create the piston assembly 100. The groove 130 has a top wall 134 and a bottom wall 136. The top wall 134 extends from a base 138 of the groove 130 to the outer surface 132 of the piston 112 at an angle approximately equal to the first angle, A1, of the piston ring 114. Similarly, the bottom wall 136 extends from the base 138 to the outer surface 132 at an angle approximately equal to the second angle, A2.

The present invention is also directed toward the method of manufacturing the piston assembly 100. First, the first side wall 124 is formed having the first angle, A1. The first side wall 124 forms the first angle, A1, by outwardly converging from the inner peripheral wall 120 to the outer peripheral wall 122. Similarly, the second side wall 126 is formed having the second angle, A2 by outwardly converging from the inner peripheral wall 120 to the outer peripheral wall 122. The first angle, A1, and the second angle, A2, are different. Finally, the ring 114 is inserted into the groove 130 of the piston 112 to form the piston assembly 100.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A piston assembly, comprising:

a ring having an inner peripheral wall and an outer peripheral wall;

a piston having a groove for receiving said ring;

said ring further including a first side wall and a second side wall, said first side wall outwardly converging at a first angle from said inner peripheral wall to said outer peripheral wall, and said second side wall outwardly converging at a second angle from said inner peripheral wall to said outer peripheral wall;

wherein said groove of said piston has top and bottom walls outwardly converging at angles approximately equal to said first and second angles of said ring; and wherein said first angle is different than said second angle by more than six degrees.

2. The piston assembly of claim 1, wherein said first angle is approximately twelve degrees and said second angle is approximately three degrees.

3. A method of manufacturing a piston assembly, comprising the steps of:

forming a first side wall having a first angle outwardly converging from an inner peripheral wall to an outer peripheral wall of a piston ring;

forming a second side wall having a second angle outwardly converging from the inner peripheral wall to the outer peripheral wall of the piston ring;

forming a groove in a piston, said groove including a first wall having a third angle outwardly converging from a base of said groove to an outer surface of said piston and said groove including a second wall having a fourth angle outwardly converging from said base to said outer surface;

inserting said piston ring into said groove of said piston;

whereby said first angle is approximately equal to said third angle and said second angle is approximately equal to said fourth angle; and whereby said first angle is different than said second angle said first angle is approximately twelve degrees and said second angle is approximately three degrees.

* * * * *